United States Patent Office

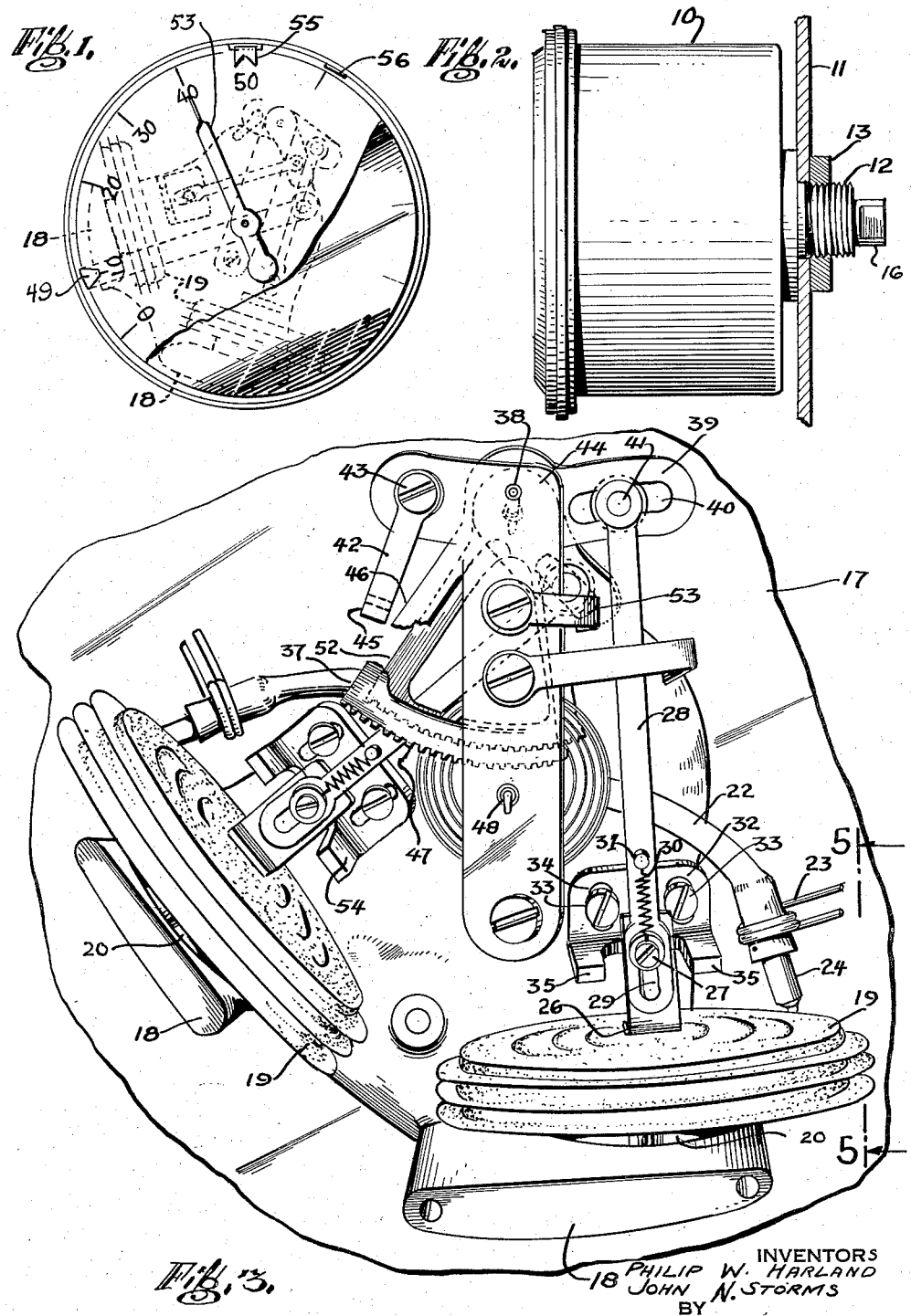

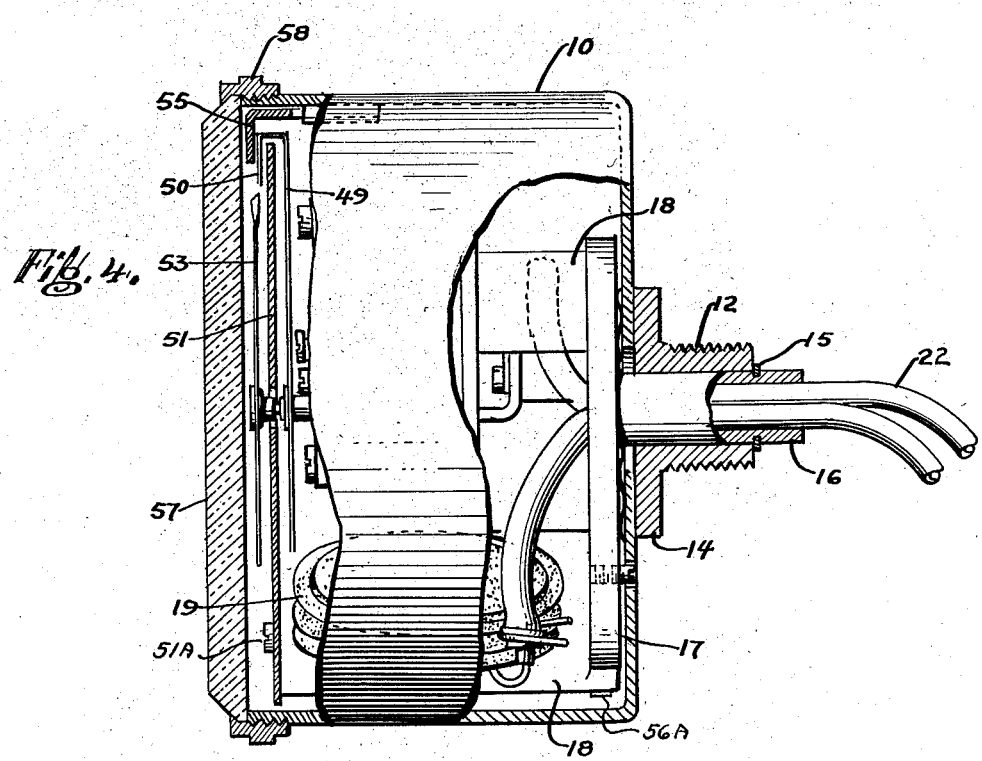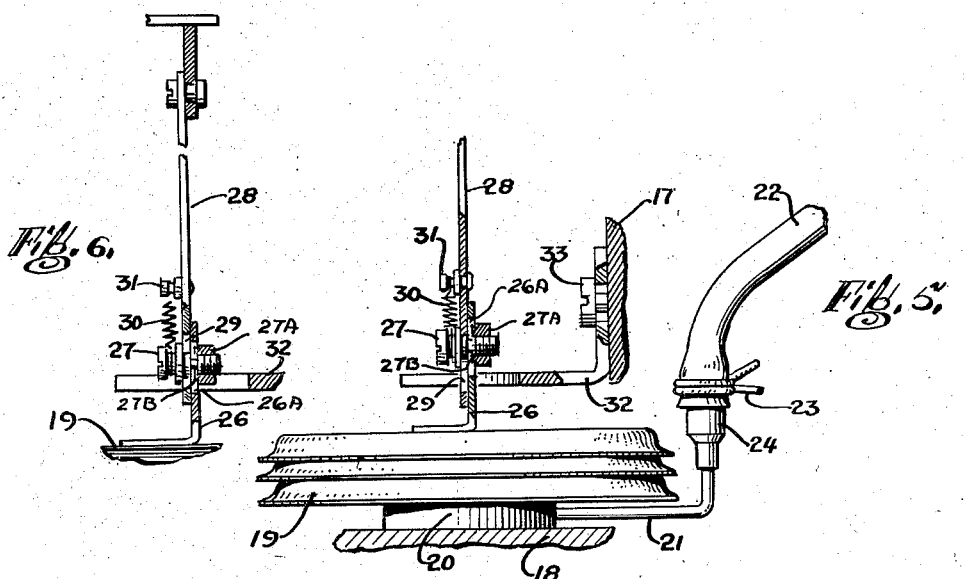

2,874,572
Patented Feb. 24, 1959

2,874,572

ROTATABLE PRESSURE GAUGES

Philip W. Harland, Sellersville, and John N. Storms, Doylestown, Pa., assignors to American Machine and Metals, Inc., New York, N. Y., a corporation of Delaware Application February 23, 1956, Serial No. 567,151

3 Claims. (Cl. 73—407)

This invention relates to condition responsive instruments and particularly to a duplex gauge arrangement.

In the instrument control field, graphic panels utilizing a plurality of instruments are being employed extensively, each of the instruments, for example, having two condition responsive elements and pointers operated thereby. In order to rapidly scan such a panel, it has been found desirable that when conditions are normal, all of the pointers should point in the same general direction, such as the twelve o'clock direction. In order to accomplish such, the internal parts of the instrument must be rotatable relative to the housing so as to orient the instruments relative to each other. When Bourdon tubes are used as the condition responsive means, it has been found that inaccuracies will result as the internal parts are rotated.

One of the objects of the invention is to provide an improved arrangement which can be turned to various positions without substantially affecting accuracy, and which can be subjected to relatively wide pressure ranges without injury to the parts.

In one form of the invention, a housing is provided for rotatably supporting or mounting a frame means, the frame means having a pair of condition responsive elements thereon, each being connected through a gauge movement with a pointer adjacent the front of the housing and frame. The condition responsive elements preferably are of the nested plate capsule type having pressure or condition responsive connecting means to the exterior of the housing. In one form, the frame can be rotatably supported relative to the housing by means of a hollow axle arrangement through which the pressure connections can pass. In using the capsule means as the condition responsive means, stops are needed so as to prevent overtravel when pressures are exerted on the capsules beyond their normal response pressure, for example, in the range of 3 to 15 p. s. i.

Each of the gauge movements can be connected to its responsive means by a connection having overtravel provision, such as a pin and slot and spring, for maintaining the links of the connection in normal condition. The connection can operate through the usual segment and pinion to move its pointer. An under-range stop is provided adjacent each of the segments to arrest movement thereof at a predetermined low pressure position, further reduction in pressure resulting in a yielding of the overtravel spring and movement of the pin in its slot or aperture so that the only load on the movement for lower pressures will be that of the spring. Overpressure stop means can be mounted on the frame overlying each of the capsules, the overpressure or over-range stops being adjustable as needed. In addition to the pointers operable by the condition responsive means, an index or control point reference can be fixed to the housing at the twelve o'clock or other desired position. The frame and its assembly can be rotated so that the dial graduation representing the desired control point setting will be under the reference mark.

Other objects, advantages, and features will become apparent from the following description and drawings which are merely exemplary.

In the drawings:

Fig. 1 is a front view with the tranparent face plate partially broken away;

Fig. 2 is a side view of Fig. 1;

Fig. 3 is a fragmentary perspective enlarged view of the gauge movements and condition responsive means;

Fig. 4 is an enlarged side view with portions in section;

Fig. 5 is a fragmentary side view of one of the condition responsive means and its connection in normal operating relationship;

Fig. 6 is a fragmentary view of the connection of Fig. 5 showing the relationship of the parts after the under-range stop has become effective.

The instrument of the present invention may have a housing 10 (Figs. 2, 4) arranged to be suitably mounted on supporting plate 11 by means of externally threaded bushing 12, said bushing being fastened to plate 11 such as by nut 13. It should be apparent that other types of housings may be provided for the internal assembly as desired and that the housing can be mounted on a panel or other place in various manners. Split washer 15 can hold the parts in assembled relation. Arbor or hollow axle 16 is rotatably mounted within bushing 12, said arbor 16 being a part of or fastened to frame means 17. Frame means 17 may have projections 18, 18 for supporting the condition responsive or capsule means 19, 19 said capsule means being mounted on a plate 20 having pipes 21 for connecting the interior of the capsules with flexible tubes 22. Tubes 22 are removably held on end connections 24 by means of clamps 23, the tubes 22 passing through arbor 16 to the exterior of the instrument for connection to the pressure or other condition to be measured.

The condition responsive means 19 preferably is composed of nested capsules as seen in Figs. 3 and 5, through being used in the form shown, such a capsule means having relatively low mass and high energy so as not to be affected substantially by their position with respect to gravity. It has been found to be efficacious to use a metal having a thermo-elastic coefficient of nearly zero, such as sold under the name "Ni-Span C." Post 26 may be located on the top of the capsule means, said post having a slot 26A through which a pin 27 passes, nut 27A being threadedly held on pin 27, said nut having a shoulder 27B entering said slot. Link 28 has a slot 29 therein also slidably receiving pin 27 so that there may be relative movement by post 26 relative to link 28. Spring 30 is fastened to link 28 by projection 31, and has its other end looped around pin 27, urging link 28 downwardly relative to post 26 as can be seen in Figs. 3 and 5. The spring can be selected to hold the link and post with the pin and slot in operative or connecting position relative to each other under normal range condition. The purpose of the overtravel pin and slot just described will be explained later.

Over-range stop means 32 may be adjustably fastened to frame means 17 by any suitable arrangement such as screws 33, said screws passing through slots 34 to permit adjustment of the stops. Upon expansion of capsule means 19 upwardly, upward movement thereof will be arrested by stops 32. In the form shown, the over-range stop has fingers 35, straddling post 26 and link 28, fingers 35 being arranged so that they will contact the capsule.

A pair of gauge movements can be mounted on frame means 17, said movements having segments 37 and 52 pivoted about axis 38, said segments having tails 39 with slots 40 for receiving the ends 41 of links 28. Under-range stop 42 for the front segment can be rotatable or adjustably mounted by means of screws 43 to the front plate 44 of the gauge movement, a similar under-range stop being provided for the rear segment and fastened to the frame 17. Arm 45 of the under-range stop 42 is arranged so that it will contact the side 46 of segment 37, and thus stop movement thereof at any desired adjusted position. After a segment has been stopped, further movement of its capsule can take place in a contracted direction because link 28, post 26 and related parts as can be seen in Fig. 6, permit overtravel of the capsule in a contracting direction.

Front segment 37 may have teeth 47 meshing with a pinion fastened to one of the shafts 48 for operating its pointer, the rear segment operating a shaft for the other pointer. In the specific instrument illustrated, front segment 37 can be employed to operate pointer 49 which has its end 50 overhanging dial plate 51, said dial plate being fastened by screws 51A to the projection 18. The other capsule can be arranged to operate rear segment 52 which in turn can be connected to pointer 53. The left-hand capsule has an under-range stop similar to stop 42 and an over-range stop 54 similar to stop 32.

A fixed index or reference mark 55 can be fastened to the upper part of housing 10 in any suitable manner. Lug 56 can be located, if desired, on the interior of the housing to cooperate with a suitable stop 56A on the frame.

It is to be understood that details of construction can be varied without departing from the spirit of the invention, except as defined in the appended claims.

What is claimed is:

1. In a condition responsive instrument, the combination comprising a housing having a fixed index means at the front thereof, a frame means rotatably mounted in said housing, a pair of pressure responsive capsule means mounted on said frame means, a pressure connection passing through said housing to each of said capsule means, a pair of gauge movements mounted on said frame means, each of said gauge movements having pointer means at the front of said housing which cooperate with said index means, connections between each of said capsule means and its respective gauge movement, said capsule means, said gauge movements, said pointer means and said connections being rotatable with said frame means relative to said housing so as to vary the position of said pointer means relative to said index means, stop means limiting travel of said gauge movements in at least one direction, and overtravel means in said connections providing for movement of each of said capsule means after its respective gauge movement has been arrested by its stop means.

2. In a condition responsive instrument, the combination comprising a housing having an aperture therein and a fixed index means at the front thereof, a frame means rotatably mounted in said housing, a pair of pressure responsive capsule means mounted on said frame means, a pressure connection to each of said capsule means, both of said pressure connections passing through said aperture to said capsule means, a pair of gauge movements mounted on said frame means, each of said gauge movements being operatively connected to pointer means adjacent the front of said housing, connections between each of said capsule means and its respective gauge movement, stop means limiting travel of each of said gauge movements in one direction, overtravel means in said connections including a pair of links with pin and slot interconnecting means providing for movement of said capsule means after its gauge movement has been arrested by its stop means, and a pair of abutment means on said frame means, each of which is adapted to directly engage one of said capsule means to limit the movement thereof in the other direction.

3. In a condition responsive instrument, the combination comprising a housing having an aperture in the rear thereof and a fixed index means at the front, a frame means rotatably mounted in said housing, a pair of pressure responsive capsule means mounted on said frame means, hollow axle means on said frame passing through said aperture, a pressure connection to each of said capsule means, both of said pressure connections passing through said axle means to said capsule means, a pair of gauge movements mounted on said frame, each of said gauge movements being connected to its respective pointer means through a sector, connections between each of said capsule means and its respective pointer means, said pointer means being cooperable with said fixed index means, stop means on said frame for contacting each of said sectors to limit movement of said connections in one direction, overtravel means in said connections providing for movement of said capsule means after its sector gauge movement has been arrested by its stop means, and adjustable abutment means fastened to said frame and overlying each of said capsule means so as to directly engage said capsule means to limit movement thereof in the opposite direction, said frame means and related parts being rotatable on said axle so as to vary the relation of the pointers with the fixed index means.

References Cited in the file of this patent

UNITED STATES PATENTS

| Number | Name | Date |
|---|---|---|
| 90,988 | Bourgeois | June 8, 1869 |
| 2,137,194 | Weber | Nov. 15, 1938 |
| 2,217,564 | Scriba | Oct. 8, 1940 |
| 2,279,861 | Davis | Apr. 14, 1942 |
| 2,391,916 | Newell | June 1, 1946 |
| 2,424,511 | Stanly et al. | July 22, 1947 |
| 2,748,355 | Jarvis | May 29, 1956 |